(12) United States Patent
Bi et al.

(10) Patent No.: US 10,015,712 B2
(45) Date of Patent: Jul. 3, 2018

(54) GATEWAY UPDATE INFORMATION NOTIFICATION METHOD, AND CONTROLLER

(71) Applicant: ZTE Corporation, Shenzhen (CN)

(72) Inventors: Yifeng Bi, Shenzhen (CN); Jing Wang, Shenzhen (CN); Tian Tian, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 134 days.

(21) Appl. No.: 15/037,812

(22) PCT Filed: Jun. 4, 2014

(86) PCT No.: PCT/CN2014/079192
§ 371 (c)(1),
(2) Date: May 19, 2016

(87) PCT Pub. No.: WO2014/183715
PCT Pub. Date: Nov. 20, 2014

(65) Prior Publication Data
US 2016/0295476 A1    Oct. 6, 2016

(30) Foreign Application Priority Data

Nov. 22, 2013   (CN) .......................... 2013 1 0598401

(51) Int. Cl.
*H04W 36/10* (2009.01)
*H04W 36/00* (2009.01)
(Continued)

(52) U.S. Cl.
CPC ....... *H04W 36/10* (2013.01); *H04W 36/0055* (2013.01); *H04W 36/12* (2013.01); *H04W 68/00* (2013.01); *H04W 88/16* (2013.01)

(58) Field of Classification Search
None
See application file for complete search history.

(56) References Cited

U.S. PATENT DOCUMENTS

2009/0176496 A1* 7/2009 Li .................... H04L 47/767
455/437
2009/0257402 A1* 10/2009 Zhu ..................... H04W 36/08
370/331
(Continued)

FOREIGN PATENT DOCUMENTS

CN        1185268 A      6/1998
CN    102238658 A     11/2011
(Continued)

OTHER PUBLICATIONS

International Search Report in international application No. PCT/CN2014/079192, dated Sep. 3, 2014.
(Continued)

*Primary Examiner* — Candal Elpenord
(74) *Attorney, Agent, or Firm* — Oppedahl Patent Law Firm LLC (57) ABSTRACT

A method and system for notifying information applied to an Evolved Packet System/General Packet Radio Service network implemented by a Software Defined Network is provided, in which, a controller reselects a gateway to obtain a new gateway and sends user plane information of the new gateway to a front-end network element. The user plane information comprises user plane address information of the new gateway. The controller sends a GPRS Tunnel Protocol (GTP) notification message or GTP Update Bearer Request message carrying the user plane information of the new gateway to the front-end network element; or sends a GTP Update Bearer Request message carrying an update indication to the front-end network element, sends a bearer response message carrying the user plane information to the (Continued)

front-end network element through a GTP Modify Bearer Response after receiving a GTP Modify Bearer Request message sent by the front-end network element.

11 Claims, 8 Drawing Sheets

(51) Int. Cl.
*H04W 36/12* (2009.01)
*H04W 68/00* (2009.01)
*H04W 88/16* (2009.01)

(56) References Cited

U.S. PATENT DOCUMENTS

| | | | | |
|---|---|---|---|---|
| 2011/0268086 | A1* | 11/2011 | Liang | H04W 36/0055 370/331 |
| 2011/0286410 | A1* | 11/2011 | Zembutsu | H04W 36/00 370/329 |
| 2013/0148498 | A1 | 6/2013 | Kean | |
| 2013/0157661 | A1* | 6/2013 | Bhaskaran | H04W 60/00 455/436 |
| 2013/0189987 | A1 | 7/2013 | Klingenbrunn et al. | |
| 2014/0078890 | A1* | 3/2014 | Lu | H04W 24/04 370/221 |
| 2014/0153544 | A1 | 6/2014 | Lu | |
| 2015/0011221 | A1* | 1/2015 | Stojanovski | H04W 48/17 455/436 |

FOREIGN PATENT DOCUMENTS

| | | |
|---|---|---|
| CN | 102316543 A | 1/2012 |
| CN | 103338487 A | 10/2013 |
| EP | 2613597 A1 | 7/2013 |
| EP | 2736282 A1 | 5/2014 |
| WO | 2013010415 A1 | 1/2013 |

OTHER PUBLICATIONS

English Translation of the Written Opinion of the International Search Authority in international application No. PCT/CN2014/079192, dated Sep. 2, 2014.

Supplementary European Search Report in European application No. 14797981.9, dated Sep. 23, 2016.

* cited by examiner

GATEWAY UPDATE INFORMATION NOTIFICATION METHOD, AND CONTROLLER

TECHNICAL FIELD

The present disclosure relates to the field of communications, and in particular to a method for notifying gateway update information and a controller.

BACKGROUND

Using Software Defined Network (SDN) technology, various complex network applications can be implemented through software programming in a control panel, for example, EPS/GPRS is implemented by SDN. Specifically, an Evolved Packet System (EPS) network is the 4th generation mobile communication network defined by the 3rd Generation Partnership Project (3GPP), and a General Packet Radio Service (GPRS) network is the 3rd generation mobile communication network defined by the 3GPP.

Figure 1:
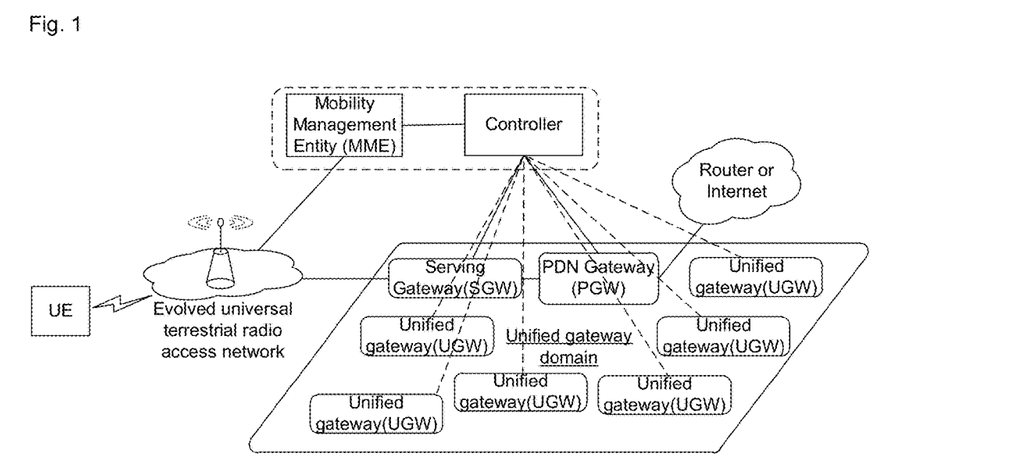
FIG. 1 is an architecture diagram of an EPS network implemented by SDN.

The architecture of an EPS network implemented through an SDN is shown in FIG. 1, where UE is a communication terminal. An Evolved Universal Terrestrial Radio Access Network (EUTRAN) is a radio access network, the inside of which is made up of an evolved Node B (eNB). A core network part, i.e., Evolved Packet Core (EPC, a core network part of EPS) network defined by software, is composed of a Mobility Management Entity (MME), a Serving Gateway (SGW), a Packet Data Network Gateway (PGW) and other device. Each unified Gateway (UGW) is a general gateway device, whose role is controlled by control signaling of an SDN controller (simply referred to as controller). In the figure, both the SGW and the PGW are played, by a UGW in which they are positioned, according to the indication of the controller. For these gateway roles, it is not excluded that two or three gateway roles are taken by a same UGW, if they are taken by a same UGW, an interface between network elements becomes an internal interface.

Figure 2:
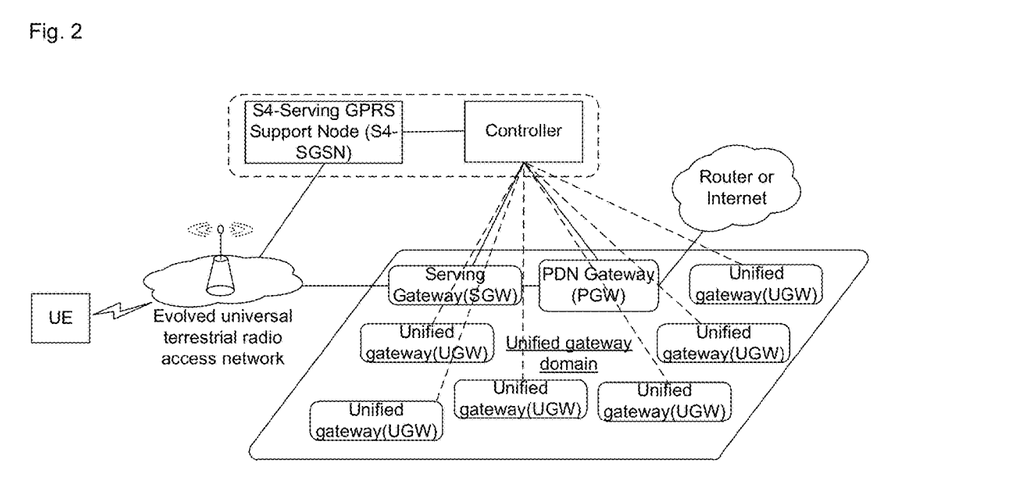
FIG. 2 is an architecture diagram for a GPRS system implemented by SDN to be accessed to an EPS network.

The architecture for a GPRS system implemented by an SDN to be accessed to an EPS network is shown in FIG. 2, where UE is a communication terminal. A Universal Terrestrial Radio Access Network (UTRAN) is a radio access network, whose inside is made up of an eNB and a Radio Network Controller (RNC). The core network part is also a core network part, EPC, of EPS, however, a function of the mobile management is performed by a control plane function of S4-SGSN (Serving GPRS Support Node) of an SGSN, i.e., by an SGSN supporting S4 interface (S4-SGSN). The SGW is an SGW supporting for interfacing with S12 of the RNC. The PGW is the same as the PGW of FIG. 1. Both the SGW and the PGW are controlled by the UGW of the controller.

The problem which occurs to the implementation of an EPS/GPRS network by an SDN is explained below referring to FIG. 1. In a traditional EPS system, a control plane and a user plane of an SGW are integrated; the SGW is selected by an MME according to positioning information, subscription information and the like of UE. However, in a system implemented by the SDN, a control plane and a user plane of the SGW are separated, the control plane of the SGW is implemented actually by a controller while the function of the user plane of the SGW is implemented by a Unified Gateway (UGW) according to an instruction from the controller to perform. Therefore, the MME is only able to select a controller, which UGW is selected to perform function of the user plane of the SGW depends on the controller. Thus each UGW is located in a pool, or in a management domain, and each UGW is borne by a general switch device or a virtual switch, thus current load information of the UGW and ON state information of the virtual switch are required to be considered in addition to the positioning information, subscription information and the like of the UE, when the controller selects a UGW. Thus, in the EPS/GPRS network implemented by an SDN, a scenario may occur, i.e., the UGW is reselected not due to the changes of positioning information, subscription information and the like of the UE but due to the change of the load state of the UGW or the ON state of the data center virtual machine, thereby the user plane of the SGW is relocated, and address of the user plane of the SGW is changed.

In a traditional internet, whether the SGW is changed is decided and perceived by the MME, the MME can actively initiate an operation for repositioning the SGW, thereby solving the forwarding problem of the user data flow and ensuring continuity of a service and integrity of the data. However, in the EPS/GPRS system implemented by the SDN, since change of the SGW cannot be perceived by the MME/S4-SGSN, a front-end network element cannot acquire information of a new SGW when the SOW has been changed, which may result in problems of disconnection of the link in the user plane, and the disconnection of the user service and disruption of the user data. When the controller reselects a POW, the case may occur that the user plane information of the new POW cannot be acquired by the MME, thereby leading to subsequent handover operation error, and thus leading to the disruption of user data.

Therefore, in a scenarios of an EPS/GPRS network implemented by an SDN, there arises a problem always that a front-end network element cannot acquire information of a new gateway when a gateway is reselected by the controller, which may result in the disconnection of the user service and disruption of the user data.

SUMMARY

In view of this, embodiments of the present disclosure are intended to provide a method and system for notifying information, which can solve at least the above problems present in the prior art.

A method for notifying gateway update information is provided according to an embodiment of the present disclosure, the method includes: a controller reselects a gateway to obtain a new gateway; the controller sends user plane information of the new gateway to a corresponding front-end network element, where the user plane information includes user plane address information of the new gateway.

In an embodiment of the present disclosure, the gateway may include at least one of a Serving Gateway (SGW) and a PDN Gateway (PGW).

In an embodiment of the present disclosure, the step that the controller sends the user plane information of the new gateway to the corresponding front-end network element may include:

a GPRS Tunnel Protocol (GTP) notification message or GTP Update Bearer Request message carrying the user plane information of the new gateway is sent to the front-end network element; or a GTP Update Bearer Request message carrying an update indication is sent to the front-end network element, the front-end network element sends a GTP Modify Bearer Request message to the controller according to the update indication, and the controller sends a bearer response message carrying the user plane information of the new gateway to the front-end network element through a GTP Modify Bearer Response.

In an embodiment of the present disclosure, the method may further include: when the gateway include a PGW, after the controller sends the user plane information of the new gateway to the corresponding front-end network element, the front-end network element sends, through an S1 interface application protocol message or an Iu message, user plane information of a new SGW to a radio access network communicating with an original SGW.

In an embodiment of the present disclosure, the front-end network element may send, through the S1 interface application protocol message or the Iu message, the user plane information of the new SGW to a radio network controller or an evolved Node B in the radio access network communicating with the original SGW.

In an embodiment of the present disclosure, the method may further include: before the front-end network element sends the user plane information of the new SGW to the radio access network communicating with the original SGW, the controller sends user plane information of a PGW communicating with the original SGW to the new SGW.

In an embodiment of the present disclosure, the front-end network element may be an mobility management entity or an S4 Serving GPRS Support Node (SGSN).

In an embodiment of the present disclosure, the method further includes: the controller reselects an SGSN, and sends user plane information, including user plane address information, of a new SGSN to a radio network controller communicating with an original SGSN.

In an embodiment of the present disclosure, the user plane information may further include a tunnel endpoint identifier.

A controller for notifying gateway update information is provided according to an embodiment of the present disclosure, the controller includes a reselecting module and a sending module; specifically, the reselecting module is configured to reselect a gateway to obtain a new gateway; and the sending module is configured to send user plane information of the gateway reselected by the reselecting module to a corresponding front-end network element, the user plane information includes user plane address information of a new SGW.

In an embodiment of the present disclosure, the sending module may be configured to: send a GTP notification message or a GTP Update Bearer Request message carrying the user plane information of the new gateway to the front-end network element; or send a GTP Update Bearer Request message carrying an update indication to the front-end network element, and send a bearer response message carrying the user plane information of the new gateway to the front-end network element after the front-end network element sends a GTP Modify Bearer Request message according to the update indication.

In an embodiment of the present disclosure, the gateway reselected by the reselecting module may include at least one of an SGW and a PGW.

In an embodiment of the present disclosure, the reselecting module may be further configured to reselect a Serving GPRS Support Node (SGSN); the sending module may be further configured to send user plane information, including user plane address information, of the SGSN reselected by the reselecting module to a radio access network communicating with an original SGSN.

The benefit effect of the present disclosure is as follows.

In the present disclosure, the controller reselect a gateway and send user plane information of the reselected gateway to a front-end network element, thereby ensuring that the user plane information of the newly reselected gateway is acquired by the front-end network element, and ensusing the continuity of the transmission of user data.

DETAILED DESCRIPTION

The present disclosure will be further explained in detail below in conjunction with specific embodiments.

First Embodiment

In order to ensure continuity of user service even when a gateway is reselected by a controller in a scenario that an EPS/GPRS network is implemented by SDN, a method is provided according to the embodiment, which includes: a controller sends user plane information of a new gateway to a front-end network element, the user plane information includes user plane address information of the new gateway, the front-end network element is an MME or an S4-SGSN.

In the scenario that the EPS/GPRS network is implemented by SDN, the gateway reselected by the controller may be an SGW or a PGW, there may be a case where both an SGW and a PGW are reselected.

Cases where a gateway address is changed may include but would not be limited to the following.

The User Equipment (UE) is moved. In order that the UE can access data in the new location and circumventing of data can be reduced as much as possible, the controller selects a new UGW for performing user plane function of a serving gateway according to positioning information of the UE, such as a Tracking Area Identity (TAI) information or address location information. For example, due to the movement of UE, a handover of replacement of an eNB or a Tracking Area Update (TAU) occurs to the UE, cell information is sent by the eNB to the MME and further sent to the controller, and the controller decides to select a new UGW gateway as a serving gateway based on strategies (including a local strategy, a subscription strategy of the UE, ect.).

Network fault occurs. For example, the controller knows that a UGW currently serving the UE fails, according to information sent from a network management system and network operational information detected by itself, and thus the controller selects a new UGW to perform user plane function of the serving gateway.

Network load is adjusted. For example, the controller detects that a UGW currently serving the UE overloads and there are other UGW lightly loaded, and then the controller decides to change a UGW to perform user plane function of the serving gateway.

A network device is adjusted. For example, when each UGW in the whole network is in light-loaded state, the whole running of each UGW may cause wasting, thus it is necessary to close some UGWs, and only a few UGWs are needed in use. In this case, the UGW performing a serving gateway function of the UE may be forced to be closed, and the function of serving gateway should be relocated to a remaining UGW, thereby resulting in the replacement of the UGW.

A virtual machine is adjusted. Since the UGW is a general gateway, the UGW may be implemented by a virtual switch. The virtual switch is a virtual device in a virtual environment, the IP of the virtual device for external communication may be modified for several reasons, thus a logically equivalent replacement of a serving gateway is resulted.

In some scenarios, relocation of a virtual machine may ensure an external IP of the virtual machine remains unchanged, and these scenarios will not result in replacement of a a UGW. This does not belong to the scope of the present disclosure.

For the different scenarios described above, the controller selects a new UGW as a serving gateway, that is, an IP address for external communication of the serving gateway is changed. The controller issues bearer context information of the UE to the newly selected UGW by issuing a flow table. Specifically, the bearer context information of the UE includes GPRS Tunnel Protocol (GTP) tunnel information (for example, a TEID of the GTP tunnel, an endpoint network element address and a port number of the GTP tunnel, etc), charging policy information, QoS policy information, etc.

The above conditions are illustrated by taking a serving gateway as an example; however, a PGW may be reselected for the same reasons.

Whether an SGW or a PGW is reselected by the controller, the controller may send user plane information of a new gateway to a corresponding front-end network element, the user plane information includes user plane address information of the new gateway.

In a scenario that an EPS network is implemented by SDN, when a gateway subjected to reselection is an SGW or a PGW, the controller sends user plane information of the new gateway to a front-end network element using one of following three ways: A. the controller sends a notification message carrying the user plane information of the reselected gateway to a front-end network element which is generally an MME; B. the controller sends an Update Bearer Request message carrying the user plane information of the reselected gateway to the MME; and C. the controller sends an Update Bearer Request message and an indication to the MME, a cause value of the indication is the replacement of the gateway, and sends a bearer response message carrying the user plane information of the new gateway to the front-end network element according to the feedback on the Update Bearer Request message by the front-end network element.

When the gateway subjected to reselection is an SGW, the controller sends the user plane information of the new gateway to the corresponding front-end network element, i.e., after the front-end network element has received the user plane information of the new serving gateway from the controller, the front-end network element also sends the user plane information of the new serving gateway to a radio access network communicating with an original serving gateway, which is generally an eNB.

In a scenario of a GPRS network implemented by the SDN, when the gateway subjected to reselection is an SGW or a PGW, the controller sends the user plane information of the new gateway to the front-end network element using one of following three ways: A. the controller sends a notification message carrying the user plane information of the reselected gateway to the front-end network element which is generally an S4-SGSN; B. the controller sends an Update Bearer Request message carrying the user plane information of the reselected gateway to the S4-SGSN; and C. the controller sends an Update Bearer Request message and an indication to the S4-SGSN, a cause value of the indication is the replacement of the gateway, and sends a bearer response message carrying the user plane information of the new gateway to the front-end network element according to the feedback on the Update Bearer Request message by the front-end network element.

When the gateway subjected to reselection is an SGW, the front-end network element also sends the user plane information of the new serving gateway to a radio access network communicating with the original serving gateway, which is generally an RNC, after the front-end network element has received user plane information of the new serving gateway from the controller.

The method further include: before the controller sends user plane information of the reselected SGW to the radio access network communicating with the original SGW, the controller sends user plane information of a PGW to the reselected SGW. This step aims to assure that uplink data of the user can be sent to the reselected serving gateway and further sent to the PGW after the user plane information of the SGW is received by the radio access network, thereby implementing transmission of the uplink data of the user.

There is another scenario for a GPRS system implemented by the SDN to be accessed to an EPS network, in which the UGW is controlled directly by the controller to implement a control plane function of the SGSN and the GGSN (Gateway GPRS Support Node), the controller interfaces with the RNC directly for interaction of the control plane signaling, the RNC interfaces with the SGSN for transmission of the user plane data. In this scenario, there may be a situation that an SGSN is reselected by the controller, the reason why the reselecting occurs is the same as above, there may also be a problem of disruption of the user data. In order to resolve this problem, the controller sends user plane information of the reselected SGSN to a radio access network of an original SGSN. Ways for sending may also be adding a new message or enhancing an existing message. The ways for sending may also be selected from the three ways described above.

The user plane information includes user plane address information, and the user plane information further includes a Tunnel Endpoint Identity (TEID) of a reselected SGW which is sent to the radio access network communicating with the original SGW when the TEID of the SGW is also changed. When the TEID of the PGW is also changed, the controller also sends the TEID of the reselected PGW to the MME or the S4-SGSN.

A controller for notifying gateway update information is further provided according to the embodiment, the controller includes a reselecting module and a sending module; the reselecting module is configured to reselect a gateway; the sending module is configured to send user plane information of the gateway reselected by the reselecting gateway to a corresponding front-end network element; the user plane information includes user plane address information of the new gateway.

The gateway reselected by the reselecting module includes at least one of an SGW and a PGW.

The reselecting module is further configured to reselect a Serving GPRS Support Node (SGSN); the sending module is further configured to send user plane information of the SGSN reselected by the reselecting module to a radio access network communicating with an original SGSN.

The reselecting module may be implemented by hardware such as a CPU and a DSP; the sending module may be implemented by hardware such as a CPU and a DSP.

The method for notifying information according to the present disclosure is explained below though more specific embodiments.

Second Embodiment

Figure 3:
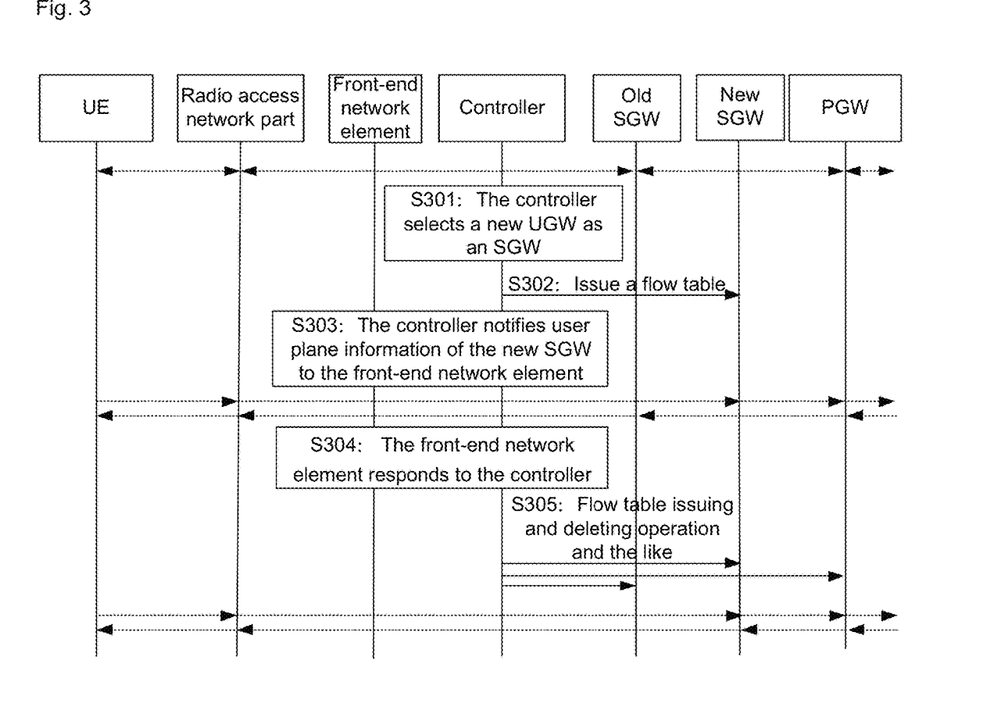
FIG. 3 is a flow chart of a method according to a second embodiment of the present disclosure.

FIG. 3 shows, for the scenario that the UE accesses an EPS core network via an EUTRAN/UTRAN, how user plane information of a gateway and a network element of the system is transmitted in the system when the controller selects a new UGW as an SGW.

S301: the controller selects a new UGW as an SGW for the reason described in the first embodiment.

S302: the controller sends, by issuing a flow table, user plane information of the PGW to the new SGW, or the reselected SGW; and the user plane information includes user plane address information, in particular, up-link user plane address information.

S303: the controller notifies the user plane information of the new SGW to the front-end network element, in particular, the plane information of the new SGW is sent to the MME in the scenario that the UE accesses the EPS core network via EUTRAN, specifically, the user plane information of the new SGW is sent to the S4-SGSN in the scenario that the UE accesses an EPS core network via UTRAN. After the flow table is issued, the new SGW is ready to send up-link data, since dataflow has not been sent from the eNB/RNC, there is temporarily no data in the SGW; the PGW is ready to receive the up-link data, and the down-link data is still issued to the old SGW through the old flow table.

S304: information representing reception of the user plane information is feedback to the controller by the front-end network element, when the user plane information of the new SGW is acquired by the front-end network element.

S305: the controller updates the down-link user plane information of the eNB/RNC onto the new SGW by updating the flow table after receiving a response message from the front-end network element. And the controller updates information of the new SGW onto the PGW by updating the flow table, this step may also be implemented in S302. And the controller may also delete information of the original SGW from the PGW, and may also delete unuseful flow tables from the original SGW. After the updating of the flow table, the new SGW is ready to send down-link data.

Third Embodiment

Figure 4:
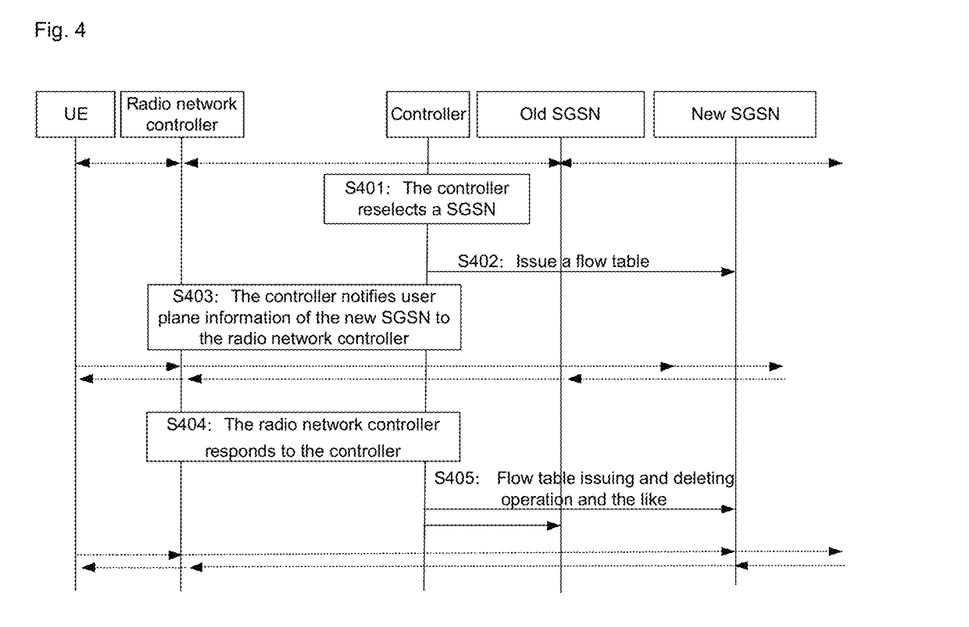
FIG. 4 is a flow chart of a method according to a third embodiment of the present disclosure.

FIG. 4 shows, for a GPRS system in an SDN scenario, in which a controller interfaces with an RNC directly for interaction of control plane signaling, how the user plane information of a gateway and a network element is transmitted when a new UGW is selected by the controller as an SGSN.

S401: the controller selects a new UGW as an SGSN for the reason described in the first embodiment.

S402: the controller sends, by issuing a flow table, user plane information of a up-link gateway communicating with the SGSN to the new SGSN; and the user plane information includes user plane address information, in particular, up-link user plane address information.

S403: the controller notifies the user plane information of the new SGSN to a radio access network, in particular, to an RNC. After the flow table is issued, the new SGSN is ready to send up-link data, since dataflow has not been sent from the RNC, there is temporarily no data in the SGW.

S404: the RNC feedbacks information to the controller after obtaining the user plane information of the new SGSN.

S405: the controller updates the down-link user plane information of the RNC onto the new SGW by updating the flow table, after receiving the response message from the RNC, this step may also be implemented in S402. And the controller may also delete information of the original SGSN from the PGW, and may also delete unuseful flow tables from the original SGSN. After the updating of the flow table, the new SGW is ready to send down-link data.

It should be noted that, although only SGSN is reselected by the controller in the embodiment, for a more complex system, there may be cases that not only the SGW and/or the PGW but also the SGSN are reselected.

Fourth Embodiment

Figure 5:
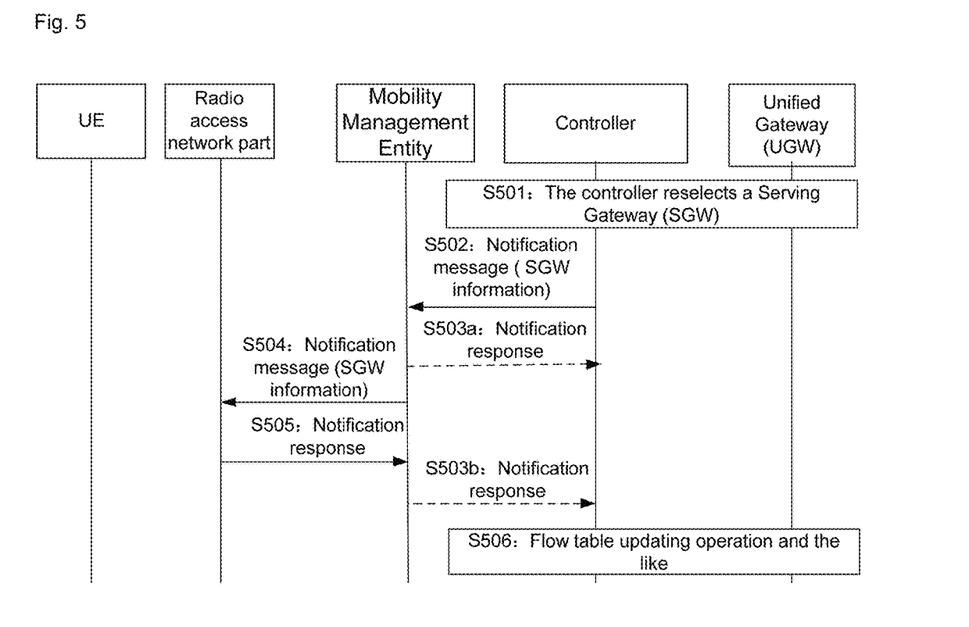
FIG. 5 is a flow chart of a method according to a fourth embodiment of the present disclosure.

FIG. 5 shows, for a scenario that the UE accesses an EPS core network via EUTRAN, when the controller selects a new UGW as an SGW, how user plane information of the new SGW is notified to eNB by the MME.

S501: the controller selects a new UGW as an SGW, an IP address of the SGW for external communication is changed.

The TEID assigned to the original SGW may be used by the newly selected SGW, or a TEID is reassigned by the controller, and a TEID is updated onto the PGW if the new TEID is assigned.

In the flow chart here, only one UGW is shown, in fact, the controller controls a group of UGWs as shown in FIG. 1 and FIG. 2. Some of the UGWs act as a new SGW, an old SGW and a PGW of the UE according to commands from the controller. Therefore, the controller should issue or update a flow table on a corresponding UGW, when the flow table is issued or updated by the controller.

S502: the controller sends, via S11 interface, a notification message carrying user plane information of the new SGW to an MME. And the user plane information of the SGW includes: user plane information, IP address for external communication (IPv4 and/or IPv6), and TEID (if a TEID is reassigned).

S503a: the MME responds to the controller with a notification response message. This step may also be implemented after S505, i.e., S503b.

S504: the MME sends a notification message of the S1-MME interface carrying the user plane information of the new SGW to a radio access network, in particular, eNB in the radio access network.

S505: the eNB responds to the MME with a notification response message.

S506: the controller updates the flow table onto the new SGW and/or PGW after receiving response message from the MME.

The controller should issue or update a flow table on a corresponding UGW, when the flow table is issued or updated by the controller.

The notification messages and notification response messages in above S502 to S505 are a GTP message and an S1-AP (S1-Application Protocol) message defined newly on an S11 interface and an S1-MME interface. Specific message interaction modes and format may not be those as shown in the FIG. 5, for example, the information interaction may be in a two-way handshake, etc.

Figure 6:
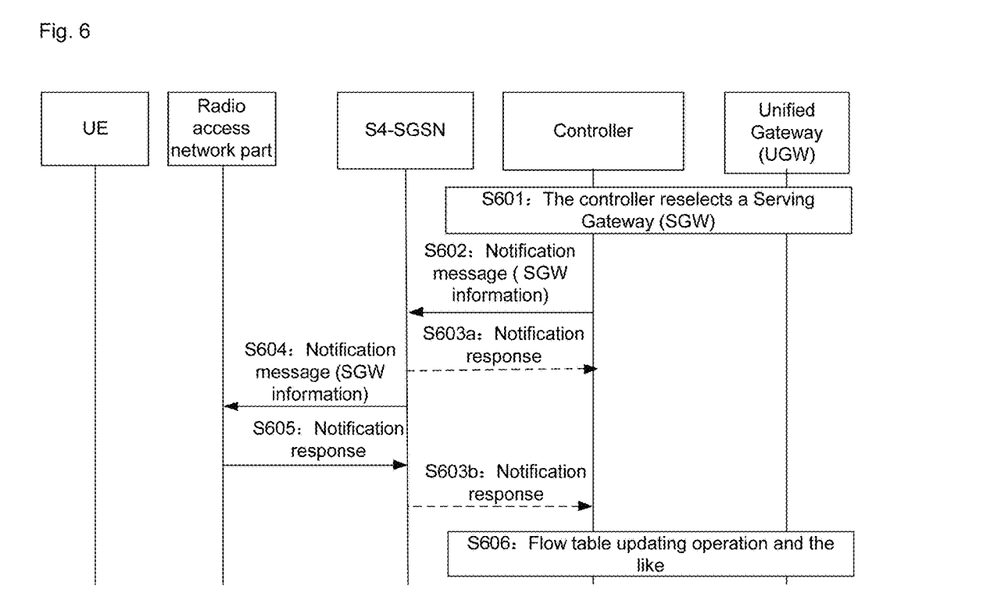
FIG. 6 is a flow chart of another method according to a fourth embodiment of the present disclosure.

In another embodiment of the present disclosure, as shown in FIG. 6, the basic operation mechanism is essentially as the same as the above embodiment, the difference is that the scenario is changed to a scenario that the UE accesses the EPC under the SDN via a UTRAN system. And the network element, the interfaces and the signaling are changed correspondingly. The MME is changed to an S4-SGSN, the controller communicates with the S4-SGSN via an S4 interface, the S4-SGSN communicates with a radio access network in particular a radio network controller via an Iu interface.

Fifth Embodiment

Figure 7:
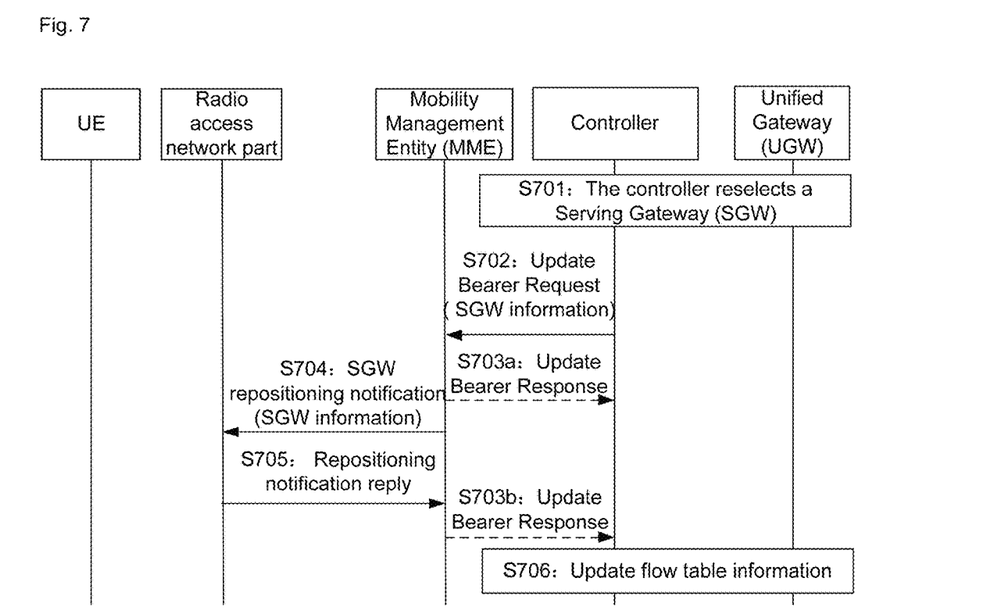
FIG. 7 is a first flow chart of a method according to a fifth embodiment of the present disclosure.

FIG. 7 shows, for a scenario that the UE accesses an EPS core network via EUTRAN, when the controller selects a new UGW as an SGW, another method is used to notify user plane information of the new SGW to eNB via an MME.

S701: it is the same as S501.

S702: the controller sends an Update Bearer Request message carrying user plane information of the new SGW to the MME. And the user plane information of the SGW is an extension field of the message, and the user plane information of the SGW includes: user plane information, IP address for external communication (IPv4 and/or IPv6), and TEID (if a TEID is reassigned).

S703a: the MME sends an Update Bearer Response message to the controller, and this step may also be implemented after S705, i.e., S703b.

S704: the MME initiates a repositioning operation process of the SGW in existing protocols and sends information of the new SGW to an eNB. The MME sends an SGW repositioning notification message to the eNB, the notification message carrying the user plane message of the new SGW.

S705: the eNB responds to the MME with an SGW repositioning notification reply message.

S707: it is the same as S307.

In addition to the Update Bearer Request/Response message described above, the messages in steps S702, S703a and S703b may also include a Delete Bearer Request/Response message and other GTP message pair, but as the first choice, the Update Bearer Request/Response message shown in the flow chart is recommended.

Figure 8:
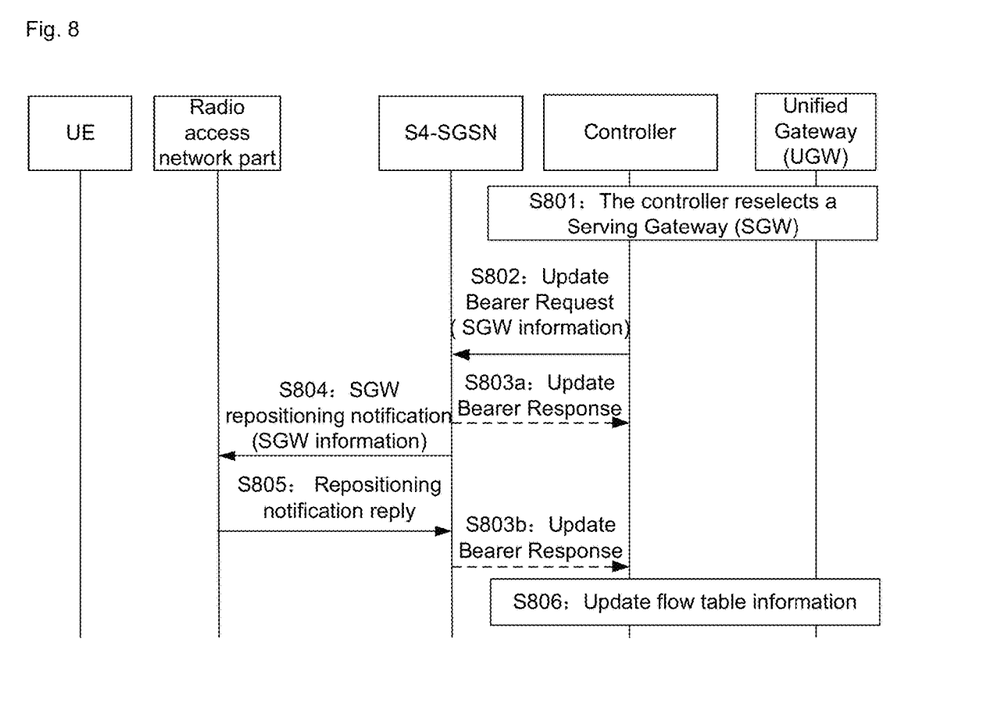
FIG. 8 is a second flow chart of a method according to a fifth embodiment of the present disclosure.

In another embodiment of the present disclosure, as shown in FIG. 8, the basic operation mechanism is essentially as the same as the above embodiment, the difference is that the scenario is changed to a scenario that the UE accesses the EPC under the SDN via a UTRAN system. And the network element, the interfaces and the signaling are changed correspondingly. The MME is changed to an S4-SGSN, the controller communicates with the S4-SGSN via an S4 interface, the S4-SGSN communicates with a radio access network in particular a radio network controller via an Iu interface.

Sixth Embodiment

Figure 9:
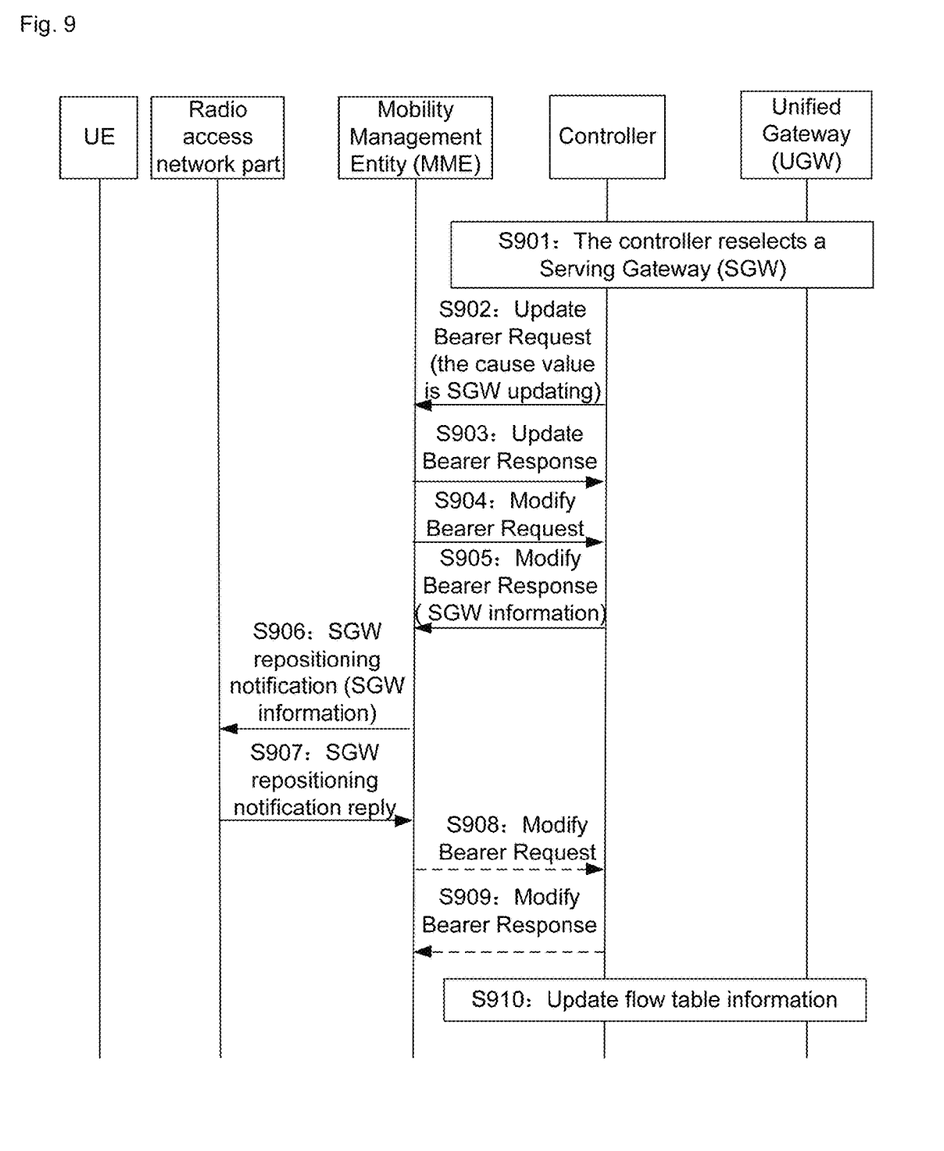
FIG. 9 is a first flow chart of a method according to a sixth embodiment of the present disclosure.

FIG. 9 shows, for a scenario that the UE accesses an EPS core network via EUTRAN, when the controller selects a new UGW as an SGW, another method is used to notify user plane information of the new SGW to eNB via an MME.

The basic operation mechanism of this embodiment is essentially as the same as the first embodiment and the second embodiment, the different is that user plane information of the newly selected SGW is delivered through another enhanced GTP message and S1-AP message.

S901: it is the same as S701.

S902: the controller sends an Update Bearer Request message to the MME. The message carries an indication, which indicates that the MME is required to initiate an operation of SGW repositioning. The indication may be the extension of the cause value of the existing message, or an additional information element.

S903: the MME responds to the controller with an Update Bearer Response message.

S904: the MME initiates an updating operation process of the SGW; and the MME sends a Modify Bearer Request of the GTP message to the controller.

S905: the controller responds to the MME with a Modify Bearer Response message, the message carries user plane information of a new SGW; and the user plane information of the SGW includes: user plane information, IP address for external communication (IPv4 and/or IPv6), and TEID (if a TEID is reassigned).

S906: the MME sends an SGW repositioning notification message carrying the user plane information of the new SGW to the eNB.

S907: the eNB responds to the MME with an SGW repositioning notification reply message.

S908: this step is optional, if tunnel information at the eNB side is changed, the MME sends a Modify Bearer Request message to the controller, new tunnel information at the eNB side such as IP address of the eNB for external communication or a TEID of the GTP tunnel is carried to the controller.

S909: the controller sends a Modify Bearer Response message to the MME.

S910: it is the same as S606.

In addition to the Update Bearer Request/Response message described above, the messages in steps S902 and S903 may also include Delete Bearer Request/Response message and other GTP message pair; in addition to the Update Bearer Request/Response message described above, the messages in steps S904 and S905 may also include a Create Bearer Request/Response message and other GTP message pair, but as the first choice, it is recommended to use the Update Bearer Request/Response message and Modify Bearer Request/Response message shown in the flow chart.

Figure 10:
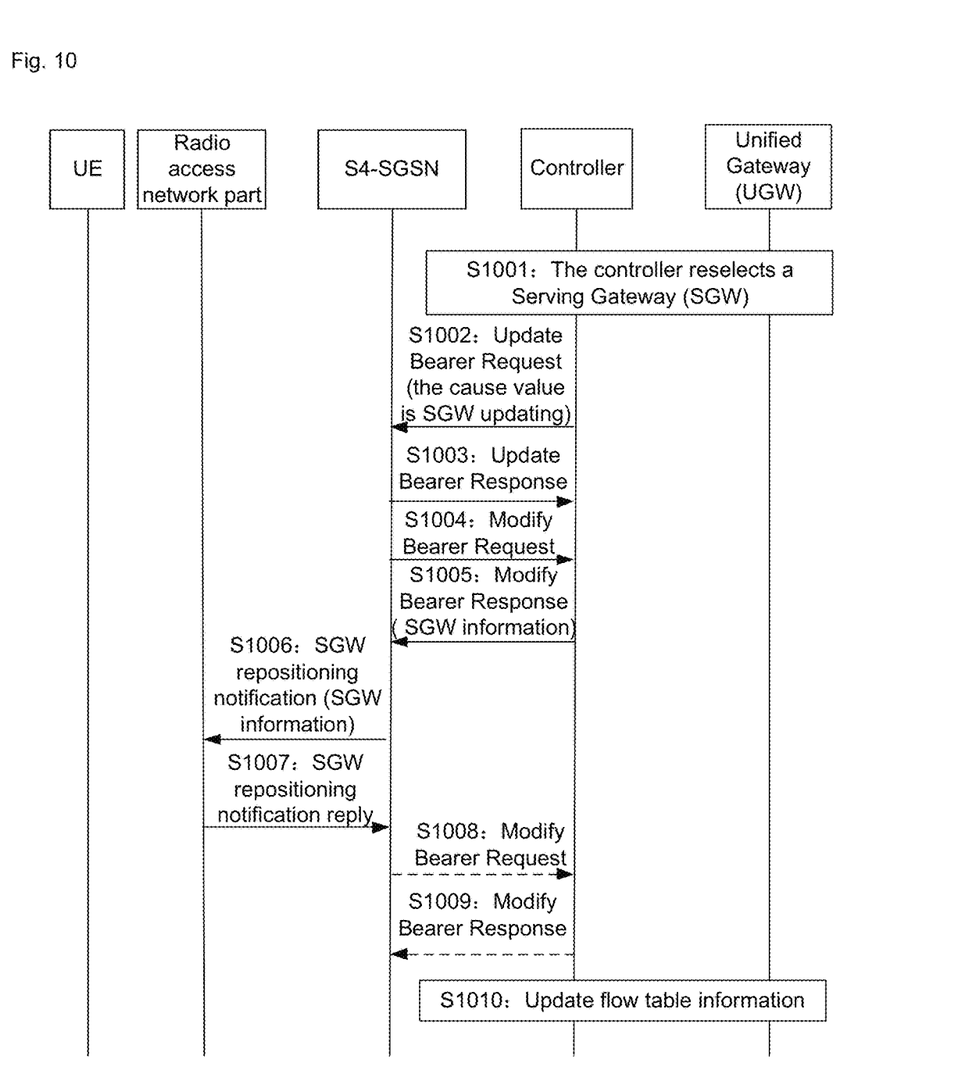
FIG. 10 is a second flow chart of a method according to a sixth embodiment of the present disclosure.

In another embodiment of the present disclosure, as shown in FIG. 10, the basic operation mechanism is essentially as the same as the above embodiment, the difference is that the scenario is changed to a scenario that the UE accesses the EPC under the SDN via a UTRAN system. And the network element, the interfaces and the signaling are changed correspondingly. The MME is changed to an S4-SGSN, the controller communicates with the S4-SGSN via an S4 interface, the S4-SGSN communicates with a radio access network in particular a radio network controller via an Iu interface.

Seventh Embodiment

After the UGW for performing the function of the PGW is reselected, and the user plane address of the PGW is changed, the controller further sends information of the PGW to the MME or the S4-SGSN so as to avoid the subsequent handover operation error. The ways for sending may also be implemented using the ways described in the fourth embodiment to the sixth embodiment in which adding message or enhancing existing message is adopted.

Figure 11:
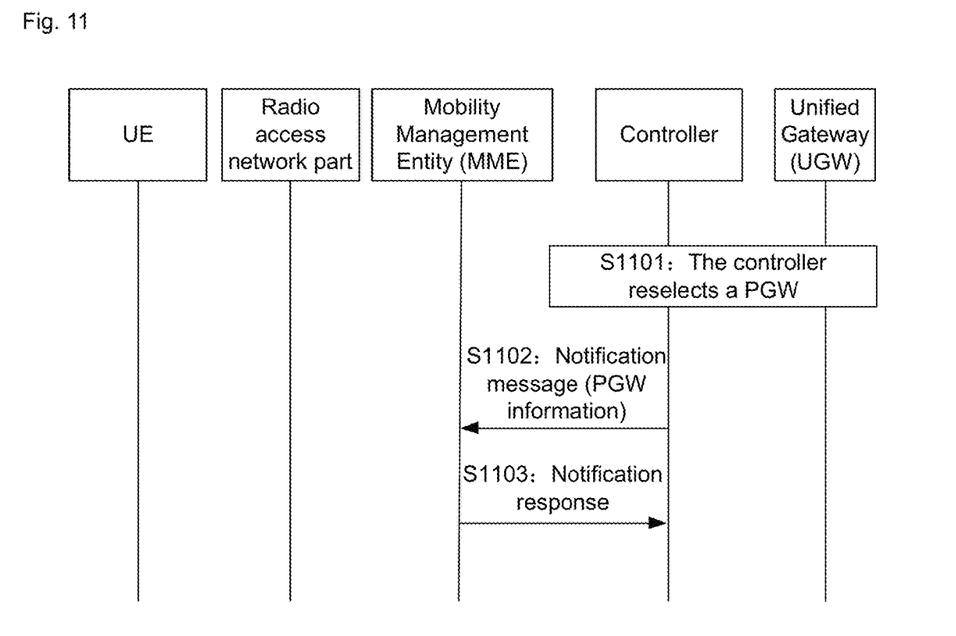
FIG. 11 is a flow chart for notifying information of a new PGW to an MME according to a seventh embodiment.

FIG. 11 shows, for a scenario that the UE accesses an EPS core network via EUTRAN, how information of the new SGW is sent to the MME by the controller.

S1101: the controller selects a new UGW as a PGW, and the IP address of the PGW for external communication is changed.

S1102: the controller sends a notification message carrying user plane information of the new PGW to the MME via an S11 interface. The user plane information of the PGW includes: user plane information, IP address for external communication (IPv4 and/or IPv6), and TEID (if a TEID is reassigned).

S1103: the MME responds to the controller with a notification response message, and this step is optional.

In another embodiment, the basic steps are essentially the same as the above embodiment, the difference only lies that in S1102, the controller sends an Update Bearer Request message carrying user plane information of the PGW to the MME using the method described in the fifth embodiment.

In another embodiment of the present disclosure, the basic operation mechanism is essentially as the same as the above embodiment, the difference is that the scenario is changed to a scenario that the UE accesses the EPC under the SDN via a UTRAN system. And the network element, the interfaces and the signaling are changed correspondingly. The MME is changed to an S4-SGSN, the controller communicates with the S4-SGSN via an S4 interface.

Obviously, it should be understood by those skilled in the art that, each module and each procedure described above according to the present disclosure may be implemented by general purpose or special purpose computing devices (including, routers, switches and other network devices and so on), which may be integrated in a single computing device, or may be distributed in a network comprising of several computing devices, alternatively, they may be implemented by a program code executed by a computing device, thus they may be stored in a storage device to be executed by the computing device, and in a certain case, the procedure shown or described may be performed in an order different form the order herein, or several modules and procedures of which may be fabricated on a single integrated circuit module. Thus, the present disclosure is not limited to any specific combination of hardware and software.

The above content is a further detail explanation of the present disclosure combined the detail embodiments, and it should be noted that the specific embodiments of the present disclosure are not limited to the explanation above. For those skilled in the art, several simple deduction or replace may further be done without departing from the concept of the present disclosure, which should be considered within the scope of protection of the present disclosure.

The invention claimed is:

1. A method for notifying gateway update information applied to an Evolved Packet System (EPS)/General Packet Radio Service (GPRS) network implemented by a Software Defined Network (SDN), comprising:
reselecting, by a controller, a gateway to obtain a new gateway;
sending, by the controller, user plane information of the new gateway to a corresponding front-end network element, wherein the user plane information comprises user plane address information of the new gateway;
wherein sending, by the controller, the user plane information of the new gateway to the corresponding front-end network element comprises:
sending a GPRS Tunnel Protocol (GTP) notification message or GTP Update Bearer Request message carrying the user plane information of the new gateway to the front-end network element; or
sending a GTP Update Bearer Request message carrying an update indication to the front-end network element, sending, by the front-end network element, a GTP Modify Bearer Request message to the controller according to the update indication, and sending, by the controller, a bearer response message carrying the user plane information of the new gateway to the front-end network element through a GTP Modify Bearer Response;
wherein the gateway, the controller and the front-end network element, are comprised in the EPS/GPRS network implemented by SDN; and
wherein the front-end network element is a mobility management entity or a Serving GPRS Support Node, SGSN, supporting S4 interface.

2. The method for notifying gateway update information according to claim 1, wherein the gateway at least comprises one of a Serving Gateway (SGW) and a PDN Gateway (PGW).

3. The method for notifying gateway update information according to claim 2, further comprising: when the gateway comprises a PGW, after sending, by the controller, the user plane information of the new gateway to the corresponding front-end network element, sending, by the front-end network element through an S1 interface application protocol message or an Iu message, user plane information of a new SGW to a radio access network communicating with an original SGW.

4. The method for notifying gateway update information according to claim 3, wherein the front-end network element sends, through the S1 interface application protocol message or the Iu message, the user plane information of the new SGW to a radio network controller or an evolved Node B in the radio access network communicating with the original SGW.

5. The method for notifying gateway update information according to claim 4, further comprising: before the front-end network element sends the user plane information of the new SGW to the radio access network communicating with the original SGW, sending, by the controller, user plane information of a PGW communicating with the original SGW to the new SGW.

6. The method for notifying gateway update information according to claim 1, further comprises: reselecting, by the controller, a Serving GPRS Support Node (SGSN), and sending user plane information, including user plane address information, of the reselected SGSN to a radio network controller communicating with an original SGSN.

7. The method for notifying gateway update information according to claim 1, wherein the user plane information further comprises a tunnel endpoint identifier.

8. A controller for notifying gateway update information applied to an Evolved Packet System (EPS)/General Packet Radio Service (GPRS) network implemented by a Software Defined Network (SDN), comprising a processor and a memory, wherein the memory coupled to the processor for storing computer readable program, which when executed by the processor causes the processor to:
reselect a gateway to obtain a new gateway; and
send user plane information of the reselected gateway to a corresponding front-end network element, the user plane information comprising user plane address information of a new Serving Gateway (SGW);
wherein the processor is further configured to:
send a GPRS Tunnel Protocol, GTP, notification message or a GTP Update Bearer Request message carrying user plane information of the new gateway to the front-end network element; or
send a GTP Update Bearer Request message carrying an update indication to the front-end network element, and send a bearer response message carrying the user plane information of the new gateway to the front-end network element through a GTP Modify Bearer Response after receiving a GTP Modify Bearer Request message according to the update indication sent by the front-end network element;

wherein the gateway, the controller and the front-end network element, are comprised in the EPS/GPRS network implemented by the SDN; and wherein the front-end network element is a mobility management entity or a Serving GPRS Support Node, SGSN, supporting S4 interface.

9. The controller according to claim 8, wherein the gateway comprises at least one of an SGW and a packet data network gateway.

10. The controller according to claim 8, wherein the processor is further configured to reselect a Serving GPRS Support the processor is further configured to send user plane information, including user plane address information, of the reselected SGSN to a radio access network communicating with an original SGSN.

11. The method for notifying gateway update information according to claim 6, wherein the user plane information further comprises a tunnel endpoint identifier.

* * * * *